United States Patent Office 3,030,204
Patented Apr. 17, 1962

3,030,204
PROCESS OF MAKING FERROALLOYS
John O. Staggers and Henry K. Bruner, Cambridge, Ohio, assignors to Vanadium Corporation of America, New York, N.Y., a corporation of Delaware
No Drawing. Filed Apr. 7, 1960, Ser. No. 20,513
2 Claims. (Cl. 75—129)

This invention relates to a process of making ferroalloys containing substantial amounts of boron and substantial amounts of at least one of the refractory metals vanadium, columbium, tantalum and titanium. A typical example of one such alloy is as follows, the percentages in the example and in all other references in this application being by weight:

| | Percent |
|---|---|
| Vanadium | 42.25 |
| Titanium | 4.60 |
| Boron | 8.80 |
| Aluminum | 2.41 |
| Carbon | 0.031 |
| Iron | Balance |

Such an alloy is useful as an addition agent for steel to increase the tensile strength and yield strength of the steel while not substantially affecting its elastic properties. Alloys according to this invention may also be used for addition to rimming steels to reduce loss of elasticity in the steels upon aging.

Alloys according to the present invention contain such high proportions of boron and one or more of the refractry metals vanadium, columbium, tantalum or titanium that it is difficult to produce them economically and satisfactorily in a single melting step by melting a charge containing the various constituents in the proportions required for producing the final alloy. The borides of these refractory metals have very high melting points which interferes with the tapping of the furnace because of skulling. Various measures were attempted to melt a charge in a single step to produce the desired alloys but these attempts were not successful.

The present invention relates to a process of making ferroalloys containing about 4 to 10% boron, up to about 5% aluminum and from 30 to 60% of one or more of the refractory metals vanadium, columbium, tantalum or titanium. The method comprises melting a charge to form ferroboron containing about 15 to 22% boron and about 1 to 5% aluminum, the balance being substantially all iron, melting a charge to form a ferroalloy containing at least one of said refractory metals in a total amount of about 60 to 85%, the balance being substantially all iron, and mixing said ferroboron and said ferroalloy while molten. By making the ferroalloy containing the refractory metal or metals in one furnace and making the ferroboron in a separate furnace and thereafter mixing them while molten, the difficulties encountered in tapping a heat made by melting a charge containing all of the desired constituents of the final alloy are overcome. The ferroalloy containing the refractory metal or metals and the ferroboron can be mixed either in a ladle or in a mold while they are molten.

In melting the charge to form the ferroalloy or the ferroboron, furnaces or other equipment most suitable for the production of the ferroalloy or the ferroboron can be employed, such as electric arc furnaces, electric induction furnaces, oil or gas-fired furnaces or alumino-thermic pots.

The ferroalloy containing the refractory metal or metals and the ferroboron are mixed while molten in proportions suitable for producing the desired composition in the final alloy. Generally, the ratio of the ferroalloy to the ferroboron is from about 1:1 to 4:1.

The following examples further illustrate the invention.

EXAMPLE 1.—PRODUCTION OF V—Ti—B—Fe ALLOYS

Ferroboron was produced by melting a charge in a single phase electric furnace rated at 170–180 volts, the furnace having a magnesite-lined shell. The charge consisted of:

| | Pounds |
|---|---|
| Iron scale | 113 |
| $B_2O_3$ | 104 |
| Pebble lime | 39 |
| Sodium chlorate | 14 |
| Grained aluminum (99+% Al) | 90 |

The reaction required 26 minutes to go to completion, including 5 minutes of superheating. Then for finishing, a mixture of 15 pounds of iron scale and 18 pounds of grained aluminum was added and allowed to react for 10 minutes. The ferroboron so produced was then ready for tapping but was held in the furnace to suit the time of tapping of a vanadium-titanium-iron alloy, the preparation of which is described hereinafter. The ferroboron so produced amounted to 115 pounds and analyzed as follows:

| | Percent |
|---|---|
| Boron | 19.16 |
| Aluminum | 1.80 |
| Carbon | 0.026 |
| Silicon | 1.49 |
| Iron | Balance |

The power consumption in this operation amounted to 120 kwh.

A vanadium-titanium-iron alloy was prepared by reacting in a magnesite-lined pot of 3 cubic feet capacity a thermit mixture consisting of:

| | Pounds |
|---|---|
| Fused $V_2O_5$ | 264 |
| Ilmenite concentrates | 144 |
| Grained Al(99+% Al) | 183 |
| Grained fluorspar | 15 |
| Pebble lime | 27 |

The reaction required 29 minutes to go to completion under continuous charging. There resulted 150 pounds of an alloy having the composition:

| | Percent |
|---|---|
| Vanadium | 74.74 |
| Titanium | 7.76 |
| Aluminum | 2.26 |
| Iron | Balance |

The ferroboron and the ferroalloy containing vanadium, titanium and aluminum were tapped simultaneously into a chill mold, thereby resulting in 265 pounds of a final alloy having the composition:

| | Percent |
|---|---|
| Vanadium | 42.25 |
| Boron | 8.80 |
| Titanium | 4.60 |
| Aluminum | 2.41 |
| Carbon | 0.031 |
| Iron | Balance |

EXAMPLE 2.—PRODUCTION OF Cb—V—B—Fe ALLOYS

Three heats 1, 2 and 3 of columbium-vanadium-iron alloys were made in the same magnesite-lined single phase electric furnace described in Example 1. Table I shows the charges used in making these heats and the amounts and compositions of the resulting alloys.

Table I

| | Heat No. 1 | Heat No. 2 | Heat No. 3 |
|---|---|---|---|
| Charge (Lbs.): | | | |
| $V_2O_5$ (Fused) | 127 | 127 | 119 |
| Ore-Lime Mixture [1] | 241 | 241 | 284 |
| Iron Scale | 49 | 49 | 24 |
| Grained Al | 107 | 107 | 103 |
| Fluorspar | 37 | 37 | 32 |
| Pebble Lime | 67 | 67 | 58 |
| Cb-V Alloys, Lbs. (Calc.) | 152 | 161 | 193 |
| Compositions of Cb-V Alloys, Percent: | | | |
| Cb | 34.5 | -------- | 43.4 |
| Ta | 1.67 | -------- | 3.05 |
| V | 31.75 | -------- | 31.40 |
| Al | .37 | -------- | .17 |
| Fe | Bal. | -------- | Bal. |

[1] Ore-Lime Mixture analysis:

| $Cb_2O_5$ | $Ta_2O_5$ | CaO | MgO | $Al_2O_3$ | FeO | $P_2O_5$ | $SnO_2$ |
|---|---|---|---|---|---|---|---|
| 42.93 | 3.99 | 23.11 | 10.97 | 7.72 | 3.82 | .038 | .031 |

Simultaneously, with the production of each of the three heats 1, 2 and 3 shown in Table I, three heats 1a, 2a and 3a of ferroboron were made in a similar furnace unit. Table II shows the relevant production data. After melting the charges 1a, 2a and 3a, a mixture of 15 pounds of iron scale and 18 pounds of grained aluminum was added to each of the melts and allowed to react for 10 minutes in a manner similar to that explained in connection with Example 1.

Table II

| | Heat No. 1a | Heat No. 2a | Heat No. 3a |
|---|---|---|---|
| Charge (Lbs.): | | | |
| Boric Anhydride | 104 | 104 | 104. |
| Iron Scale | 113 | 112 | 112. |
| Manganese Dioxide | 1 | 1 | 1. |
| Sodium Chlorate | 14 | 14 | 14. |
| Pebble Lime | 39 | 39 | 39. |
| Grained Al (99%) | 90 | 100 | 95. |
| Ferroboron Alloys, Lbs. (Calc.) | 100 | 100 | 100. |
| Compositions of Fe-B Alloys, Percent: | | | |
| B | 17.34 | 19.88 | Not analyzed. |
| Al | 2.63 | 3.63 | Do. |
| Fe | Bal. | Bal. | Do. |

The three heats 1, 2 and 3 of columbium-vanadium-iron alloys shown in Table I were mixed, respectively, in ladles with the three heats 1a, 2a and 3a of ferroboron shown in Table II. The weights and compositions of the resulting columbium-vanadium-boron-iron alloys are given in Table III and are designated 1b, 2b and 3b, respectively.

Table III

| | Alloy No. 1b | Alloy No. 2b | Alloy No. 3b |
|---|---|---|---|
| Weight (Lbs.) | 249 | 258 | 289 |
| Compositions (percent): | | | |
| Cb | 23.2 | 19.9 | 28.7 |
| V | 21.85 | 19.10 | 20.75 |
| B | 4.90 | 7.23 | 6.24 |
| Ta | 1.32 | 1.01 | 2.04 |
| Al | .58 | .08 | .14 |
| Si | 1.00 | 1.12 | 1.32 |
| C | .069 | .068 | .052 |

The invention is not limited to the preferred embodiment but may be otherwise embodied or practiced within the scope of the following claims.

We claim:

1. A process of making ferroalloys containing, by weight, about 4 to 10% boron, up to about 5% aluminum and at least one of the refractory metals of the group consisting of vanadium, columbium, tantalum and titanium in a total amount of about 30 to 60%, the balance being substantially all iron and incidental impurities, which comprises melting a charge to form ferroboron containing about 15 to 22% boron and about 1 to 5% aluminum, the balance being substantially all iron, melting a charge to form a ferroalloy containing at least one of said refractory metals in a total amount of about 60 to 85%, the balance being substantially all iron, and mixing said ferroboron and said ferroalloy while molten and while outside of a furnace.

2. A process according to claim 1, wherein the ratio, by weight, of said ferroalloy to said ferroboron is from about 1:1 to 4:1.

References Cited in the file of this patent

UNITED STATES PATENTS 813,278     Canda     Feb. 20, 1906